United States Patent [19]
Kitajima et al.

[11] Patent Number: 5,178,121
[45] Date of Patent: Jan. 12, 1993

[54] AIR/FUEL RATIO CONTROL SYSTEM FOR INTERNAL COMBUSTION ENGINE

[75] Inventors: Shinichi Kitajima, Wako; Yoshihiko Kobayashi, Haga, both of Japan

[73] Assignee: Honda Giken Kogyo Kabushiki Kaisha, Tokyo, Japan

[21] Appl. No.: 858,741

[22] Filed: Mar. 27, 1992

[30] Foreign Application Priority Data

Apr. 2, 1991 [JP] Japan .................................. 3-69995

[51] Int. Cl.$^5$ .............................................. F02D 41/14
[52] U.S. Cl. ...................................... 123/689; 123/694
[58] Field of Search ................. 123/14, 491, 494, 689, 123/694, 686

[56] References Cited

U.S. PATENT DOCUMENTS

| | | | |
|---|---|---|---|
| 4,967,714 | 11/1990 | Inoue | 123/694 |
| 5,060,619 | 10/1991 | Sakurai et al. | 123/494 |
| 5,094,208 | 3/1992 | Adam et al. | 123/696 X |
| 5,121,732 | 6/1992 | Benninger et al. | 123/672 |

*Primary Examiner*—Tony M. Argenbright
*Attorney, Agent, or Firm*—Nikaido, Marmelstein, Murray & Oram

[57] ABSTRACT

A system for controlling an air/fuel ratio of an internal combustion engine supplied with a blended fuel of gasoline and alcohol and equipped with a blowby gas ventilator. An oxygen sensor is provided and an amount of fuel supply is corrected in response to the detected air/fuel ratio within a range having a lower limit set in the lean direction and an upper limit set in the rich direction. At engine starting, injected alcohol may not vaporize but leak into the crankcase and will then vaporize to pass into the air intake passage along with the blowby gas when the engine temperature rises, causing the air/fuel ratio to be become rich beyond the correction lower limit. For that reason, in this system, engine coolant temperature and alcohol content in the fuel are detected. And if the temperature is within a range defined from the alcohol boiling point when the alcohol content is above a reference value, the lower limit of the range is shifted in the leaner direction. The air/fuel ratio can therefore be corrected in the lean direction.

7 Claims, 2 Drawing Sheets

AIR/FUEL RATIO CONTROL SYSTEM FOR INTERNAL COMBUSTION ENGINE

BACKGROUND OF THE INVENTION

1. Field of the Invention

This invention relates to an air/fuel ratio control system for an internal combustion engine, and more particularly to an air/fuel ratio control system for an internal combustion engine which uses a fuel containing alcohol and is equipped with the blowby gas ventilator.

2. Description of the Prior Art

There are in use engine air/fuel ratio control systems in which the amount of fuel supplied to the engine is optimized by regulating the fuel injection period of a fuel injection nozzle installed in the air intake passage. In these systems, the actual air/fuel ratio is calculated from the oxygen concentration of the engine exhaust gas, which is detected by, for example, an oxygen sensor installed in the engine exhaust passage, and the amount of fuel injected is increased/decreased so as to bring the actual fuel injection near the stoichiometric ratio. In this type of feedback control, so as to ensure that a problem such as failure of the oxygen sensor will not cause the amount of fuel injected to deviated greatly from the proper value, the range of adjustment is fixed in advance between a lower range set in the lean direction with respect to the air/fuel ratio and an upper limit set in the rich direction. And when the corrected amount calculated falls above or below this range, the calculated value is discarded and the upper or lower limit of the fixed range is used instead.

On the other hand, the fact that alcohol produces a smaller amount of nitrogen oxides and other harmful emissions than conventional fuels such as gasoline has led to increasing use of alcohol as an alternative fuel. While alcohol is sometimes used without blending, it is also often used as mixed with a conventional fuel in a blending ratio appropriate for the circumstances. One example is the hybrid fuel known as M85, which consists of 85% methanol (methyl alcohol) and the remainder of gasoline.

Alcohols not only have a large latent heat of vaporization but also have a smaller stoichiometric air/fuel ratio than gasoline (6.4:1 for methanol, for example, compared with 14.7:1 for gasoline) and thus have to be injected in large amounts. Just after starting, before the engine has warmed up, it is therefore possible that a part of the injected alcohol may not vaporize but leak into the crankcase through the gap between the piston and the cylinder wall. As a result, the alcohol gets into the engine oil and then, as the engine temperature increases, vaporizes and passes into the air intake system along with the blowby gas when the blowby gas ventilator is equipped.

The rate of vaporization of the alcohol from the engine oil is not constant but increases rapidly as the engine temperature approaches the boiling point of the alcohol (64.7° C. for methanol). When this happens, the amount of alcohol recirculated to the intake system rises sharply, causing the air/fuel ratio to become rich. If feedback control is being conducted, the amount of fuel injected will therefore be corrected downward. However, the amount of this correction cannot exceed the lower limit of the fixed range mentioned earlier. Since this lower limit is not sufficient when the amount of vaporized alcohol being recirculated becomes large, engine emmission is impaired.

This invention was accomplished in view of the foregoing problem and has as its object to provide an air/fuel ratio control system for an internal combustion engine which ensures that engine emmission will not be impaired even when the amount of alcohol vapor recirculated together with the blowby gas becomes large.

SUMMARY OF THE INVENTION

This invention achieves this object by providing an air/fuel ratio control system for an internal combustion engine supplied with a fuel containing alcohol and equipped with a blowby gas ventilator. The system has first means for detecting air/fuel ratio of the engine exhaust gas and control means for correcting an amount of fuel supply at least in response to the detected air/fuel ratio within a predetermined range having a lower limit set in a lean direction with respect to the air/fuel ratio and an upper limit set in the opposite direction. The characteristic feature of the system is that the system has second means for detecting an engine temperature indicative of the condition of alcohol vaporization and third means for shifting the lower limit of the predetermined range in the leaner direction when the detected temperature is above a reference temperature.

BRIEF EXPLANATION OF THE DRAWINGS

These and other objects and advantages of the invention will be more apparent from the following description and drawings, in which.

DETAILED DESCRIPTION OF PREFERRED EMBODIMENTS

An embodiment of the invention will now be explained with reference to the drawings.

Figure 1:
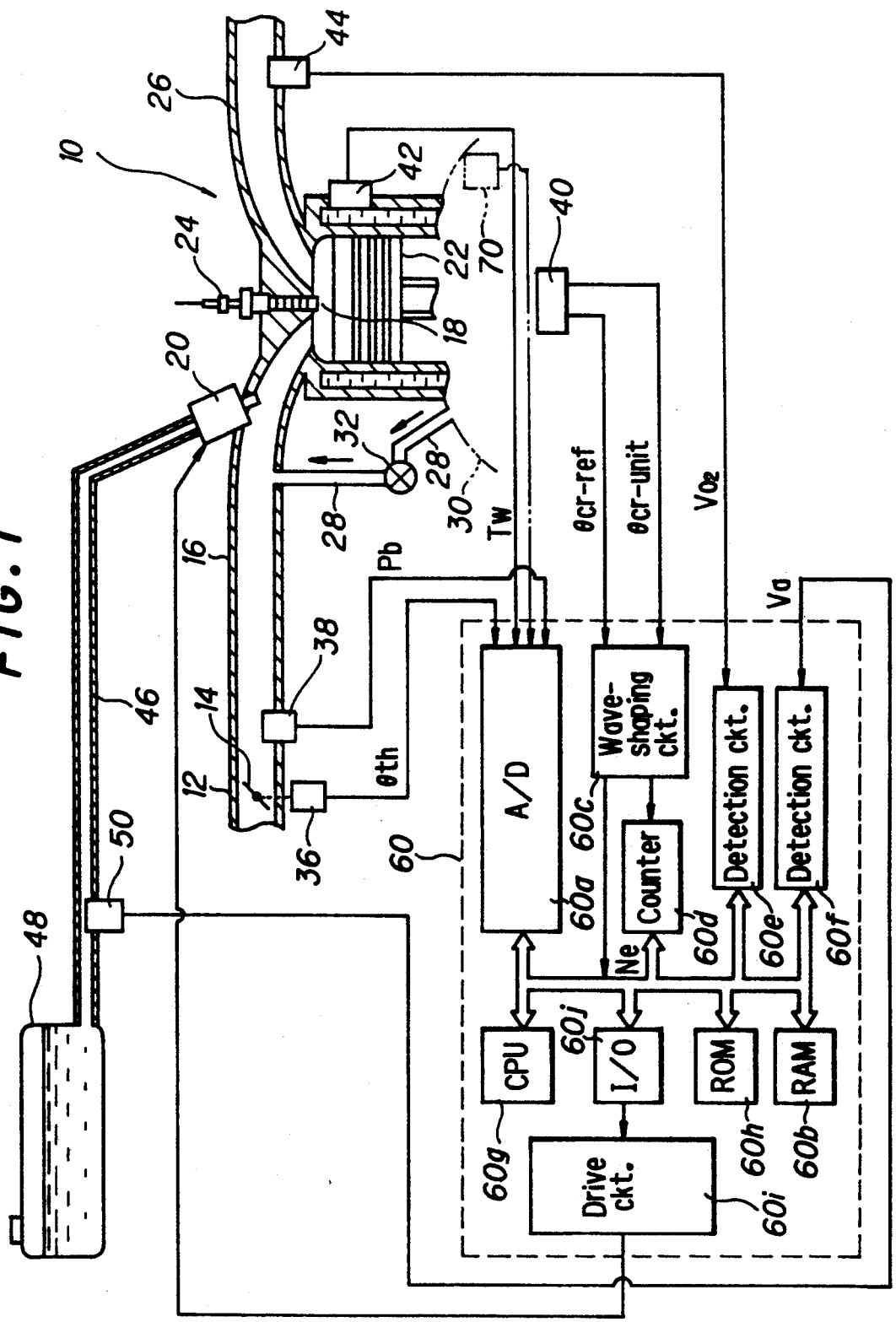
FIG. 1 is a block diagram showing the arrangement of an air/fuel ratio control system for internal combustion engine according to the invention.

In FIG. 1, a four-cylinder vehicle internal combustion engine 10 has an air intake passage 12. Air drawn in through an air cleaner (not shown) has its flow rate controlled by a throttle valve 14 and passes into a manifold 16 integrally connected to the passage 12, from where it is supplied to the individual combustion chambers 18 (only one shown). A fuel injection nozzle 20 is provided in the vicinity of each chamber 18 for supplying fuel thereto. The intake air and the fuel are mixed and the resulting air-fuel mixture is drawn into the chamber 18 when an intake valve (not shown) is opened. After being compressed in the chamber by a piston 22, the air-fuel mixture is ignited by a spark plug 24, whereupon it burns explosively to drive the piston down and the burnt gas is passed to the exterior through an exhaust passage 26 during the exhaust stroke. Blowby gas is recirculated via a passage 28 connected between the air intake passage 12 at a point downstream of the throttle valve 14 and a crankcase 30. A PCV (positive crankcase ventilation) valve 32 is provided in the passage 28 for forcibly recirculating the blowby gas using manifold pressure in the known manner.

The air intake passage 12 is provided with a throttle position sensor 36 for generating a signal indicative of the opening degree 8th of the throttle valve 14 and an absolute manifold pressure sensor 38, at a position downstream of the throttle valve 14, for producing a signal indicative of the absolute manifold pressure Pb. A crankshaft angle sensor 40 is provided to produce a reference signal $\theta$cr-ref once per 720 degrees of crankshaft rotation and a unit signal $\theta$cr-unit once per a predetermined number of degrees of crankshaft rotation. Further, a coolant temperature sensor 42 is provided to generate a signal indicative of the coolant temperature Tw. The exhaust passage 26 has an oxygen sensor 44 for generating a signal corresponding to the oxygen content $V_{O2}$ of the exhaust gas. The fuel injection nozzle 20 is connected via a fuel supply conduit 46 with a fuel tank 48 containing a blended fuel composed of gasoline and methanol. An alcohol sensor 50 is installed in the conduit 46 for generating a signal indicative of the alcohol content Va of the fuel.

The output signals from all of the aforesaid sensors are sent to a control unit 60 made up of a microcomputer. Analog sensor signals forwarded to this unit are converted into digital signals by an A/D converter 60a and are temporarily stored in a RAM (random access memory) 60b, a portion of which is supplied with backup power even when the engine is stopped. The outputs of the crankshaft angle sensor 40 are waveshaped by a waveshaping circuit 60c and the signal $\theta$cr-unit is then input to a counter 60d for determining the engine speed Ne. The outputs of the sensors 44 and 50 are respectively sent to detection circuits 60e and 60f. A CPU (central processing unit) 60g processes the detected values in accordance with instructions stored in a ROM (read-only memory) 60h so as to calculate the amount of fuel to be supplied in a manner described later and outputs a signal Tout expressing the fuel supply amount in terms of an injection period. The calculated signal Tout is sent through an I/O port 60j to a drive circuit 60i which controls the fuel injection nozzle 20 so as to inject fuel for the period indicated by the signal Tout. The signal Tout is defined as:

$$Tout = KALC \cdot K_{O2} \cdot k \cdot Ti + T$$

In this equation, Ti is a basic fuel injection period corresponding to a fuel injection amount preset in terms of gasoline to obtain a stoichiometric air/fuel ratio with respect to the amount of intake air calculated from the engine speed and the absolute manifold pressure. The value k designates a correction factor such as a temperature correction factor for increasing the amount of fuel injected when the engine coolant temperature is low or a load correction factor for increasing the amount of fuel injected in a high-load range defined in terms of the engine speed, the absolute manifold pressure and the throttle opening. T is an injection period correction factor used during transient operation and may, for example, be a fuel supply period correction time for increasing the amount of fuel injected during acceleration. $K_{O2}$ is a feedback correction factor for eliminating the difference between the actual air/fuel ratio calculated from the oxygen content $V_{O2}$ during the aforesaid feedback control and the preset stoichiometric air/fuel ratio. KALC is an alcohol correction factor preset on the basis of the alcohol content Va detected by the alcohol sensor 50.

Just after the engine has been started, i.e. when the coolant temperature Tw is low, a part of the alcohol contained in the fuel injected from the fuel injection nozzle 20 fails to vaporize and leaks into the crankcase in liquid state and thus gets mixed into the engine oil. Then, as the coolant temperature Tw rises, alcohol mixed with the engine oil vaporizes and, together with the blowby gas, is recirculated through the passage 28 to the intake passage 12. Since this causes the air/fuel ratio to become rich, the oxygen content $V_{O2}$ of the exhaust gas detected by the oxygen sensor 44 decreases. Based on this lower value of the oxygen content $V_{O2}$, the control unit 60 discerns that the air/fuel ratio has become rich and, in response, reduces the feedback correction factor $K_{O2}$ within a predetermined range having a lower limit set in the lean direction with respect to the air/fuel ratio and an upper range set in the opposite rich direction. As a result, the injection period indicated by signal Tout is regulated to a shorter length so as to maintain the air/fuel ratio at the proper value. However, if the alcohol vaporization rate should continue to increase, it eventually becomes necessary to change or shift the lower limit set on the correction factor $K_{O2}$ in the leaner direction so as to enable its value to be decreased below the lower limit in effect up to that time.

Changing or shifting of the lower limit is carried out by the control unit 60 in accordance with a prescribed program which will now be explained with reference to the flowchart of FIG. 2.

The program according to this flowchart assumes that the coolant temperature Tw is between prescribed temperatures TwL and TwH (TwL < TwH) and that when the alcohol correction factor KALC is equal to or greater than a reference value $KALC_1$ corresponding to a prescribed alcohol content, to be explained later, the lower limit value of the feedback correction factor $K_{O2}$ is to be shifted from K1L to K2L (K1L > K2L: this means K2L is the limit set in the leaner direction).

More specifically, when the coolant temperature is found to be not lower than the prescribed temperature TwL (step S1) and not higher than the prescribed temperature TwH (step S2) and, moreover, the alcohol correction factor KALC is found to be not lower than the reference value $KALC_1$ (step S3), the procedure advances to step S4 in which a flag F is set to 1. In all other cases, the procedure goes to step S5 and the flag F is set to 0. The prescribed temperatures are defined on the basis of the alcohol boiling point. In the case of methanol, which has a boiling point of 64.7° C., TwL and TwH are respectively set at, say, 55° C. and 70° C. Moreover, when an alcohol content of the fuel being used is lower than a certain level (typically 70%), the amount of alcohol vapor recirculated to the intake system does not become so large as to require the lower limit to be brought down. For that reason, the reference value $KALC_1$ is set at a value corresponding to that for an alcohol content in the neighborhood of 70%. Shifting of the lower limit is therefore prohibited when the alcohol content of the fuel is less the prescribed value.

The procedure then advances to step S6 in which $K_{O2}$ is compared with K1H (the upper limit of $K_{O2}$) and if $K_{O2} \geq K1H$, i.e. if $K_{O2}$ is at or above the upper limit K1H set in the rich direction, the procedure goes to step S7 in which $K_{O2}$ is limited to K1H. On the other hand, if $K_{O2} < K1H$, the procedure goes to step S8 in which the state of the flag F is checked. If F=0, since, as stated earlier, this means that there is no need to change the lower limit placed on $K_{O2}$, the procedure goes to step S9 in which the lower limit K1L and $K_{O2}$ are compared. If $K_{O2} \leq K1L$, i.e. if $K_{O2}$ is at or lower than the lower limit value K1L, $K_{O2}$ is limited to K1L. On the other hand, if $K_{O2} > K1L$, this means that $K_{O2}$ is within the set range and, therefore, $K_{o2}$ is maintained at the value at that time.

However, if it is found in step S8 that the flag F=1, the procedure moves to step S11 in which $K_{o2}$ is compared with the other lower limit K2L. If $K_{o2} \leq K2L$, the procedure goes to step S12 in which, similarly to the case of step S10, $K_{o2}$ is restricted to the other lower limit K2L which is set in the leaner direction. On the other hand, if $K_{o2} > K2L$, then similarly to step S9, $K_{o2}$ is maintained at the value at that time.

Thus, taking into account the fact that the rate of vaporization of the alcohol mixed into the engine oil peaks in the vicinity of the alcohol boiling point, the system detects the engine coolant temperature and when the detected temperature comes within the range defined on the basis of the alcohol boiling point, shifts the lower limit of the aforesaid factor correction range so as to extend the downward correction of the amount of fuel injected.

Next, the second embodiment of the invention will be explained. In the second embodiment, instead of the coolant temperature sensor 42, an engine oil temperature sensor 70, illustrated in FIG. 1 by a phantom line, is used for detecting the condition of alcohol vaporization. Except that engine oil temperatures be used in steps S1 and S2 in FIG. 2 flowchart in lieu of the coolant temperatures, the second embodiment is the same as the first embodiment so that no more description will be needed.

Figure 2:
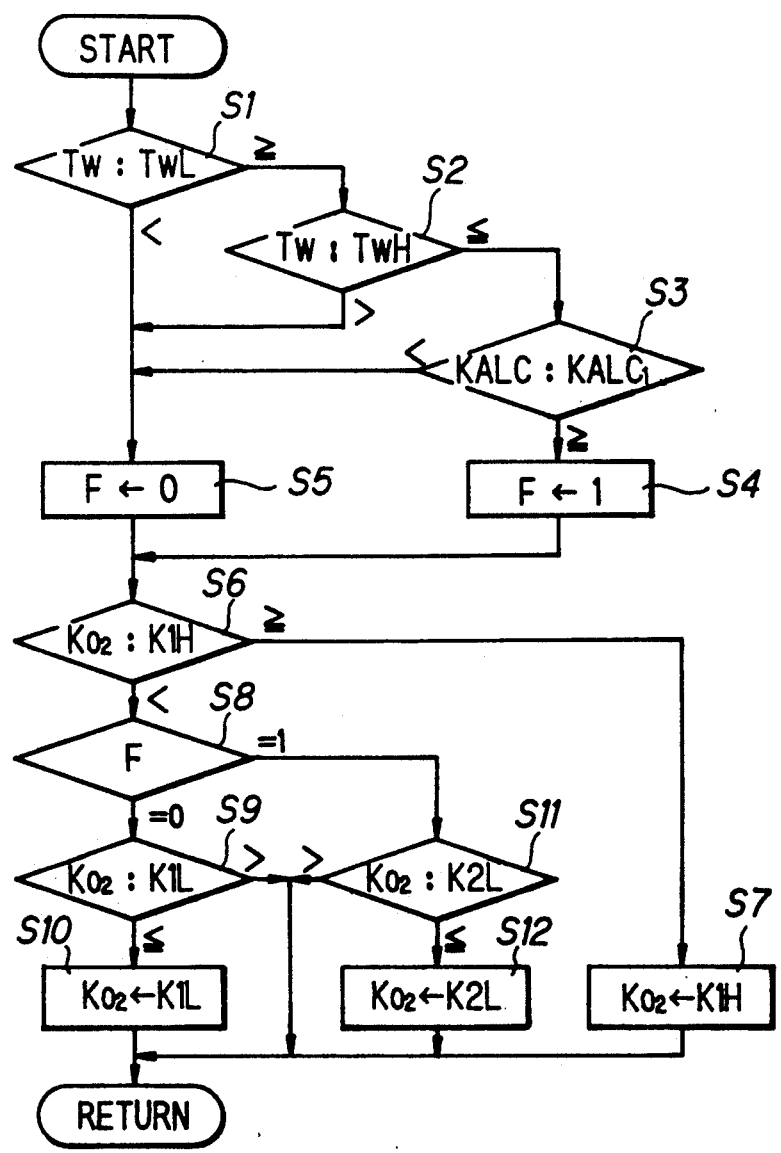
FIG. 2 is a flowchart showing the mode of the operation of the system.

While not indicated in FIG. 2, it is also possible to use upper and lower limit values that differ from the aforesaid K1H, K1L and K2L during idling or other specific engine operation states. Moreover, although shifting the lower limit is prohibited when the alcohol content of the fuel is less than the prescribed value, it is alternatively possible to shift the limit even when the content is below the value.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling an air/fuel ratio for an internal combustion engine supplied with a fuel containing alcohol and equipped with a blowby gas ventilator, the system having first means for detecting air/fuel ratio of the engine exhaust gas and control means for correcting an amount of fuel supply at least in response to the detected air/fuel ratio within a predetermined range having a lower limit set in a lean direction with respect to the air/fuel ratio and an upper limit set in the opposite direction;

wherein the improvement comprises:
said system having second means for detecting an engine temperature indicative of the condition of alcohol vaporization; and
third means for shifting the lower limit of the predetermined range in the leaner direction when the detected engine temperature is above a reference temperature.

2. A system according to claim 1, further including fourth means for detecting the alcohol content of the fuel, and said third means shifts the limit in the leaner direction if the detected alcohol content is above a reference content when the detected temperature is above the reference temperature.

3. A system according to claim 2, wherein said reference temperature is defined on the basis of the alcohol boiling point.

4. A system according to claim 2, wherein said engine temperature is an engine coolant temperature.

5. A system according to claim 2, wherein said engine temperature is an engine oil temperature.

6. A system for controlling an air/fuel ratio for an internal combustion engine supplied with a fuel containing and alcohol and equipped with a blowby gas ventilator, the system having first means for detecting air/fuel ratio of the engine exhaust gas and control means for determining an amount of fuel by correcting a value of a factor at least in response to the detected air/fuel ratio within a predetermined range having a lower limit set in a lean direction with respect to the air/fuel ratio and an upper limit set in the opposite direction;

wherein the improvement comprises:
the system further including second means for detecting an engine temperature indicative of the condition of alcohol vaporization; and
third means for shifting the lower limit of the predetermined range in the leaner direction when the detected temperature is within a range defined on the basis of the alcohol boiling point.

7. A system according to claim 6, further including fourth means for detecting the alcohol content of the fuel, and said third means shifts the limit in the leaner direction if the detected alcohol content is above a reference content when the detected temperature is within the range.

* * * * *